United States Patent
Cao et al.

(10) Patent No.: US 9,088,476 B2
(45) Date of Patent: Jul. 21, 2015

(54) NETWORK COMMUNICATION SYSTEM WITH PACKET FORWARDING AND METHOD OF OPERATION THEREOF

(75) Inventors: Xiaochong Cao, Fremont, CA (US); Wen Hsu, Arcadia, CA (US); Jian-Jr Li, Hsinchu County (TW); Chih-Hsien Hsu, Zhubei (TW)

(73) Assignee: Cortina Access, Inc., Sunnyvale, CA (US)

( * ) Notice: Subject to any disclaimer, the term of this patent is extended or adjusted under 35 U.S.C. 154(b) by 126 days.

(21) Appl. No.: 13/078,737

(22) Filed: Apr. 1, 2011

(65) Prior Publication Data

US 2012/0250687 A1 Oct. 4, 2012

(51) Int. Cl.
*H04L 12/751* (2013.01)
*H04L 12/727* (2013.01)
*H04L 12/743* (2013.01)

(52) U.S. Cl.
CPC .............. *H04L 45/02* (2013.01); *H04L 45/121* (2013.01); *H04L 45/7453* (2013.01)

(58) Field of Classification Search
CPC . H04L 29/06095; H04L 45/02; H04L 45/121; H04L 45/7453
USPC ...................... 370/395.32; 711/216
See application file for complete search history.

(56) References Cited

U.S. PATENT DOCUMENTS

| | | | |
|---|---|---|---|
| 6,985,483 B2 * | 1/2006 | Mehrotra et al. | 370/389 |
| 7,206,861 B1 * | 4/2007 | Callon | 709/242 |
| 7,554,914 B1 * | 6/2009 | Li et al. | 370/235 |
| 7,764,606 B1 | 7/2010 | Ferguson et al. | |
| 8,094,659 B1 * | 1/2012 | Arad | 370/392 |
| 2005/0114393 A1 * | 5/2005 | Wilson | 707/104.1 |
| 2005/0129014 A1 | 6/2005 | Lee et al. | |
| 2005/0213693 A1 * | 9/2005 | Page | 375/354 |
| 2006/0031628 A1 * | 2/2006 | Sharma | 711/105 |
| 2007/0091893 A1 * | 4/2007 | Yazaki et al. | 370/392 |
| 2007/0171908 A1 * | 7/2007 | Tillman et al. | 370/389 |
| 2008/0148386 A1 | 6/2008 | Kreuk | |
| 2009/0010167 A1 * | 1/2009 | Ma | 370/235 |
| 2010/0246584 A1 * | 9/2010 | Ferguson et al. | 370/392 |

* cited by examiner

*Primary Examiner* — Alpus H Hsu
*Assistant Examiner* — Walter Divito
(74) *Attorney, Agent, or Firm* — Ishimaru & Associates LLP

(57) ABSTRACT

A method of operation of a network communication system includes: analyzing a packet header by: loading a packet input register, generating a forwarding hash from the packet input register, and identifying a routing update by comparing the forwarding hash; accessing a packet analysis bus for updating the packet header; and enabling a routing switch for forwarding a packet including the packet header updated.

20 Claims, 4 Drawing Sheets

NETWORK COMMUNICATION SYSTEM WITH PACKET FORWARDING AND METHOD OF OPERATION THEREOF

TECHNICAL FIELD

The present invention relates generally to a network communication system, and more particularly to a system for managing packet forwarding during network communication.

BACKGROUND ART

Internet traffic increases by a factor of 10 every year while the number of hosts on the Internet increases by a factor of 3 every 2 years. This means that in order to maintain the same performance levels, packets now need to be forwarded faster despite there being a larger forwarding database. Larger databases increase the number of memory accesses required to determine the address of the next node to which a packet is to be forwarded. Such an address is commonly referred to as a next hop address.

In order to meet the demands of high-speed routing, such as gigabit or terabit routing, it is desirable that address lookups be performed in hardware. Currently, the fastest software approaches still take hundreds of nanoseconds on average in order to perform address lookups, which is unsuitable for such high-speed forwarding.

The lookup to determine the next hop address of a packet is the most time critical part in packet forwarding. The problem of searching in large databases is compounded by the fact that routing tables store variable length prefixes and their corresponding next hop addresses. In order to forward a packet, routers need to find the longest prefix in the routing table that matches the destination address in a packet to be forwarded.

A number of approaches have been developed to search for longest matching prefixes. Most approaches fall under the category of search trees. In conventional search trees, each bit in the address of a received packet is used to determine a path through the tree. A '0' points to the left half of a sub-tree within the tree and a '1' points to the right half of a sub-tree within the tree. The lookup proceeds by traversing the tree until a leaf node is located. The tree data structure includes nodes that store pointers to child nodes. All leaf nodes and some internal nodes contain next hop information. Some implementations require only leaf nodes to store next hop information in which case the internal nodes store only pointers to child nodes.

In most conventional implementations, the entire tree structure that includes the next hop addresses is stored in one memory. As routing tables become larger, such data structures will not fit entirely in on-chip memories. As a result, off-chip memory accesses are required. Because multiple off-chip memory accesses are required, the goals of fast and constant network address lookups cannot be achieved.

Thus, a need still remains for network communication system with packet forwarding. In view of the exploding usage of the Internet and the availability of on-line information, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a network communication system including: analyzing a packet header by: loading a packet input register, generating a forwarding hash from the packet input register, and identifying a routing update by comparing the forwarding hash; accessing a packet analysis bus for updating the packet header; and enabling a routing switch for forwarding a packet including the packet header updated.

The present invention provides a network communication system including: a hash engine for analyzing a packet header by: a packet input register, a circuit for generating a forwarding hash from the packet input register, and a comparator for identifying a routing update by comparing the forwarding hash; a packet analysis bus between the hash engine and the packet input register; and a routing switch coupled to the packet input register and the hash engine.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
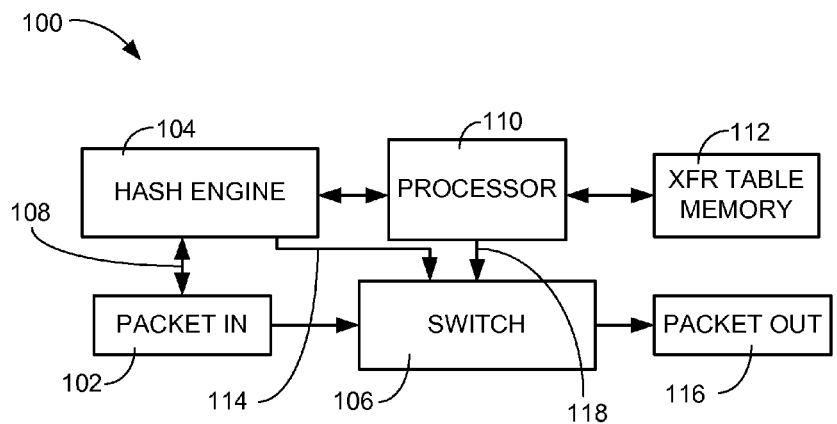
FIG. 1 is a functional block diagram of a network communication system with packet forwarding in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Referring now to FIG. 1, therein is shown a functional block diagram of a network communication system 100 with packet forwarding in an embodiment of the present invention. The functional block diagram of the network communication system 100 depicts a packet input register 102 for capturing the packet details of a communication packet. The packet input register 102 is coupled to a hash engine 104, such as a hardware look-up engine having packet forwarding capabilities, and a routing switch 106.

A packet analysis bus 108, such as a bi-directional bus for accessing packet header information is coupled between the packet input register 102 and the hash engine 104. During the operation of the network communication system 100, the hash engine 104 may read selected information from the packet input register 102 and write update information into the packet input register 102 prior to forwarding the contents of the packet input register 102 to the routing switch 106.

A forwarding processor 110, such as a general purpose processor or a special purpose processor, is coupled to the hash engine 104 and the routing switch 106. The forwarding processor 110 may execute instructions stored in a transfer table memory 112. The transfer table memory 112 may also act as a general-purpose storage for the forwarding processor 110.

The routing switch may be controlled by the hash engine 104 or the forwarding processor 110. If the hash engine 104 determines that the contents of the packet input register 102 are already known, it may perform updates of the contents of the packet input register 102 and enable the routing switch 106, by a fast forwarding control 114, for forwarding the contents of the packet input register 102 through the routing switch to a packet output buffer 116.

It has been discovered that when the contents of the packet input register 102 are recognized by the hash engine 104 a fast packet forwarding process may be executed without the intervention of the forwarding processor 110. This fast packet forwarding process may reduce the packet forwarding delay by hundreds of nano-seconds as compared to a software-only-forwarding solution.

In the event that the contents of the packet input register 102 are not recognized by the hash engine 104, the forwarding processor 110 may analyze the contents of the packet input register 102. In this process the contents of the packet input register 102 are accessed by the forwarding processor 110 through the hash engine 104. When the forwarding processor 110 determines what update is required to the contents of the packet input register 102, it performs a write-through operation to update the hash engine 104 and the contents of the packet input register 102 at the same time.

The forwarding processor 110 may program the routing switch 106, by an initial forwarding control 118, at the completion of the update of the contents of the packet input register 102. This operation allows the contents of the packet input register 102 to be forwarded to the packet output buffer 116 in order to be passed on to the next destination.

The transfer table memory 112 may contain operational instructions for the forwarding processor 110 as well as data that serves as a routing table for the control of packets that are forwarded through the network communication system 100. Since most packet communication, as carried by the Internet, occurs in a series of messages exchanged between a single source and a single destination, the forwarding processor 110 may only be required to be involved on the first message of such a series of messages. All subsequent messages are handled by the hash engine 104 without intervention of the forwarding processor 110.

It has been discovered that the intervention of the forwarding processor 110 on only the initial packet of a series of packet exchanges represents a dramatic reduction in the overhead associated with fast packet forwarding through a network routing device.

It is understood that the above description of the network communication system 100 is an example only and is not intended to limit the invention to only this implementation. By way of an example, the transfer table memory 112 may be fabricated within the forwarding processor 110. It is also understood that means for updating the packet header through the packet analysis bus 108 may be performed in other ways. Further it is understood that the fast forwarding control 114 and the initial forwarding control 118 may be combined as a single control sourced from the hash engine 104 and activated by the internal logic of the hash engine 104 or the forwarding processor 110.

Figure 2:
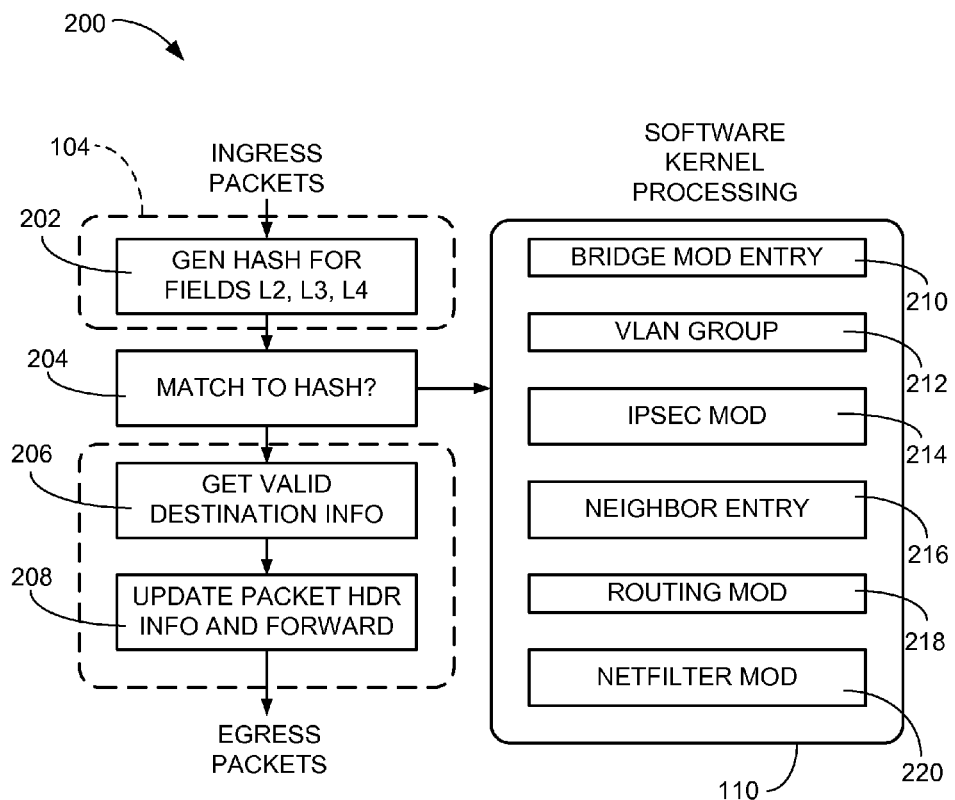
FIG. 2 is a functional diagram of processes used by the network communication system of FIG. 1.

Referring now to FIG. 2, therein is shown a functional diagram of processes 200 used by the network communication system 100 of FIG. 1. The functional diagram of processes 200 depicts a generate hash block 202, in which the hash engine 104 may be set-up to generate a hash recognition scheme for the content of the packet input register 102, of FIG. 1. The hash engine 104 may be enabled to use certain portions of the content of the packet input register 102.

A match to hash block 204 may perform a search of the internal storage of the hash engine 104 to find a record that provides updated routing information for the content of the packet input register 102. If a match is detected by the match to hash block 204, the hash engine 104 will access the updated information in a valid destination block 206. The current packet forwarding destinations are stored within the hash engine 104 in order to allow the fast packet forwarding to take place without intervention of the forwarding processor 110.

The valid destination information located by the valid destination block 206 may include intermediate switching destination information known as a next hop entry, which allows sequential intermediate destinations in the fast packet forwarding scheme. The updated destination information may relate to the open system interconnection (OSI) model for levels 2 through 4. In that model, level 2 relates to the data link and specifies hardware related information for the logical link control (LLC) and the media access control (MAC). The level 3 relates to the network and provides switching and routing criteria for the packet. Finally, layer 4 relates to the transport layer and provides flow control and accounting for message segments that are broken into packets and reassembled at the final destination of the message.

While the OSI model actually defines interconnection levels between 1 and 7, only levels 2 through 4 are utilized by this embodiment of the present invention. All of the layers 2, 3, and 4 are needed for packet forwarding. Primarily the layer 2 operations are used to address switching processes and the layer 3 operations are used in the routing processes, while layers 3 and 4 are used for network address port translation (NAPT) or other transport forwarding.

Once the correct next hop entry is identified, the content of the packet input register 102 may be adjusted to reflect the current network switching pattern by an update packet header block 208. The update packet header block 208 also enabled the routing switch 106, of FIG. 1, in order to commence the fast packet forwarding process.

It is understood that while the description has involved only a single fast packet forwarding process, the embodiment of the present invention may process more than one of the fast packet forwarding processes concurrently through the hash engine 104.

If the match to hash block 204 does not locate a match for the content of the packet input register 102, the forwarding processor 110 may invoke software kernel processing to initialize the internal registers of the hash engine 104 and update the content of the packet input register 102 in a concurrent operation. Upon completion of the update to the packet input register 102, the forwarding processor 110 may enable the routing switch 106 to complete the packet forwarding process. When a next message arrives that generates the same forwarding hash, the hash engine 104 will complete the fast packet transfer without intervention of the forwarding processor 110.

During the software kernel processing performed by the forwarding processor 110, information related to the OSI levels 2-4 may be updated based on a current switching table accessed by the forwarding processor 110. The information may include parameters related to the OSI levels 2-4, such as a bridge module update 210, a virtual local area network (VLAN) group update 212, an Internet protocol security (IP-Sec) update 214, a neighboring module update 216, a routing module update 218, and a netfilter module update 220. It is understood that the items listed as being updated are examples and may differ in actual operation.

Figure 3:
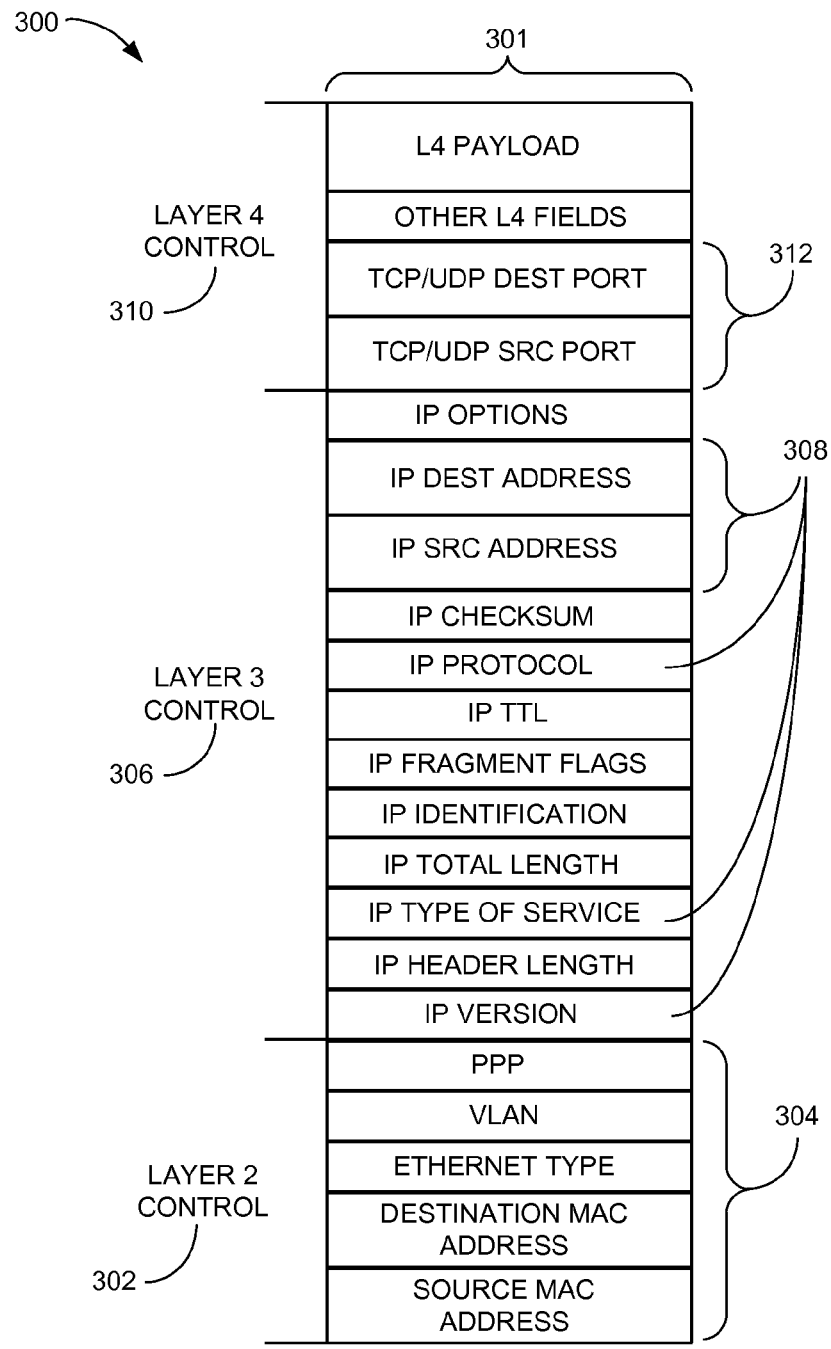
FIG. 3 is a functional diagram of header fields accessed by the network communication system of FIG. 1.

Referring now to FIG. 3, therein is shown a functional diagram of a packet header 300 accessed by the network communication system 100, of FIG. 1. The functional diagram of the packet header 300 depicts the contents or fields 301 of the packet input register 102, of FIG. 1, that may be selected for generating a forwarding hash as enabled by an initial set-up of the hash engine 104, of FIG. 1, by the forwarding processor 110, of FIG. 1. The summation of all of the fields 301 in the packet header 300 comprise a unified hash key, which is a superset of bridging, network address translation (NAT) and routing. Any of the fields 301 that are defined and not used by incoming packets are filled with zeroes. The checksum field utilizes a 32 bit cyclical redundancy check (CRC) such as a CRC32 algorithm.

The content of the packet input register 102 is segregated by the OSI layer to which its contents apply. A layer 2 control 302 may enable the inclusion of a first routing element 304, which includes the destination MAC address, source MAC address, VLAN. PPP, and Ethernet type.

It is understood that other fields shown in the layer 2 control 302 area may be included in generation of the forwarding hash or updated by the hash engine 104. The use of the first routing element 304 allows unique identification of the communication between source device and a destination device coupled to the network communication system 100, of FIG. 1.

A layer 3 control 306 may enable the inclusion of a second routing element 308, which includes the Internet Protocol (IP) source address, the IP destination address, IP protocol, IP type of service, and IP version. It is understood that any of the fields 301 in the layer 3 control 306 may be accessed or updated by the hash engine 104 in the performance of the fast packet forwarding process as previously described.

A layer 4 control 310 may enable the inclusion of a third routing element 312, which includes the TCP source port and the TCP destination port. It is understood that any of the fields 301 in the layer 4 control 310 may be accessed or updated by the hash engine 104 in the performance of the fast packet forwarding process as previously described.

Figure 4:
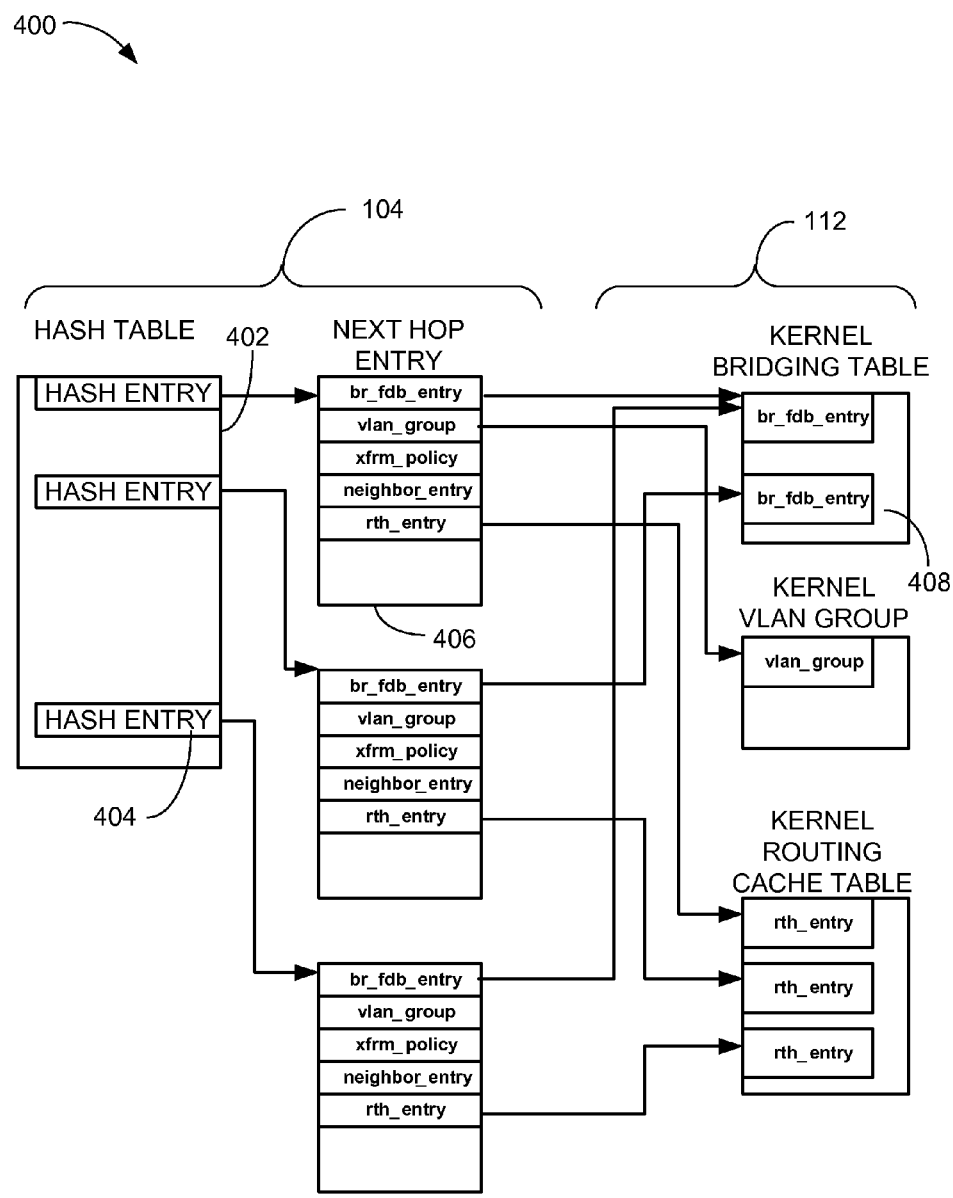
FIG. 4 is a functional diagram of operational links in the network communication system of FIG. 1.

Referring now to FIG. 4, therein is shown a functional diagram of operational links 400 in the network communication system 100, of FIG. 1. The functional diagram of the operational links 400 depicts a hash table 402 having a hash entry 404, which may have been loaded by a circuit within the hash engine 104 that reflects the content of the packet input register 102, of FIG. 1 at the time the hash entry 404 was loaded. The hash entry 404 will remain active in the hash table 402 until the hash engine 104 is initialized or it is overwritten due to inactivity of that message sequence and demand for space to manage new message sequences is required.

The hash entry 404 may be generated by a circuit (not shown) internal to the hash engine 104 by manipulating the fields 301 of FIG. 3 of the packet input register 102 that are selected. The hash entry 404 is unique to a message sequence between a single source device (not shown) and a single destination device (not shown). As is common in network communication, a message sequence may require many packets to be exchanged between the source device and the destination device. After the initial packet has been transferred, all of the information required to perform a fast packet transfer will be located in a next hop entry 406.

The next hop entry 406 is linked to the unique one of the hash entry 404 through a memory link process. This enables immediate access to the information required to update the contents of the packet input register 102 by the hardware circuits of the hash engine 104. It is understood that the memory link process may be enabled by discrete hardware registers that contain the next hop entry 406 and can be accessed without restricting others of the next hop entry 406.

As shown in FIG. 4, a plurality of the hash entry 404 are concurrently stored, with each having a linked memory containing the next hop entry 406 associated with the hash entry 404. It is understood that the hash engine 104 may process more than one packet concurrently, so that accessing any of the next hop entry 406 does not prevent concurrent access to any other of the next hop entry 406.

When a new forwarding hash is generated by the circuit within the hash engine 104, it is compared, by a comparator circuit (not shown) within the hash engine 104, with the hash entry 404 listed in the hash table 402. When a match is not found, it indicates that a next hop entry is not yet available for that forwarding hash. The forwarding processor 110 of FIG. 1 is invoked to enter the forwarding hash as a new entry in the hash table 402 and information linked for the next hop entry 406 may be established from the software kernel process.

In that process the forwarding processor may concurrently provide the required information for the next hop entry 406 and update the contents of the packet input register 102. The hash engine 104 maintains the consistency of the corresponding Kernel entries of the individual packet connections. The Kernel entries may include bridge table entries, VLAN group entries, routing cache entries, and IPSec entries. It is understood that the previous list is an example only and additional information may be maintained for the packet connections.

When the forwarding processor 110 initializes the next hop entry 406 for the forwarding hash, it is entered into the hash table 402 as a new member of the hash entry 404. Upon completion of the generation of the next hop entry 406, the forwarding processor 110 enables the routing switch 106, of FIG. 1 to forward the packet.

It is understood that the inclusion of the hash entry 404 for the first time is slower than subsequent packet processing when the hash entry is identified by the comparator circuit, in the hash engine 104, and processed without the intervention of the forwarding processor 110. It is further understood that the next hop entry 406 may be constructed concurrently with a different one of the next hop entry 406 updating a different packet for fast packet forwarding.

It is further understood that during the software kernel process, the forwarding processor may transfer the required information from the transfer table memory 112 in order to supply the next hop entry 406. It is further understood that due to the nature of message exchange, a single entry in the kernel bridging table 408 may be used for multiple different entries of the next hop entry 406.

Figure 5:
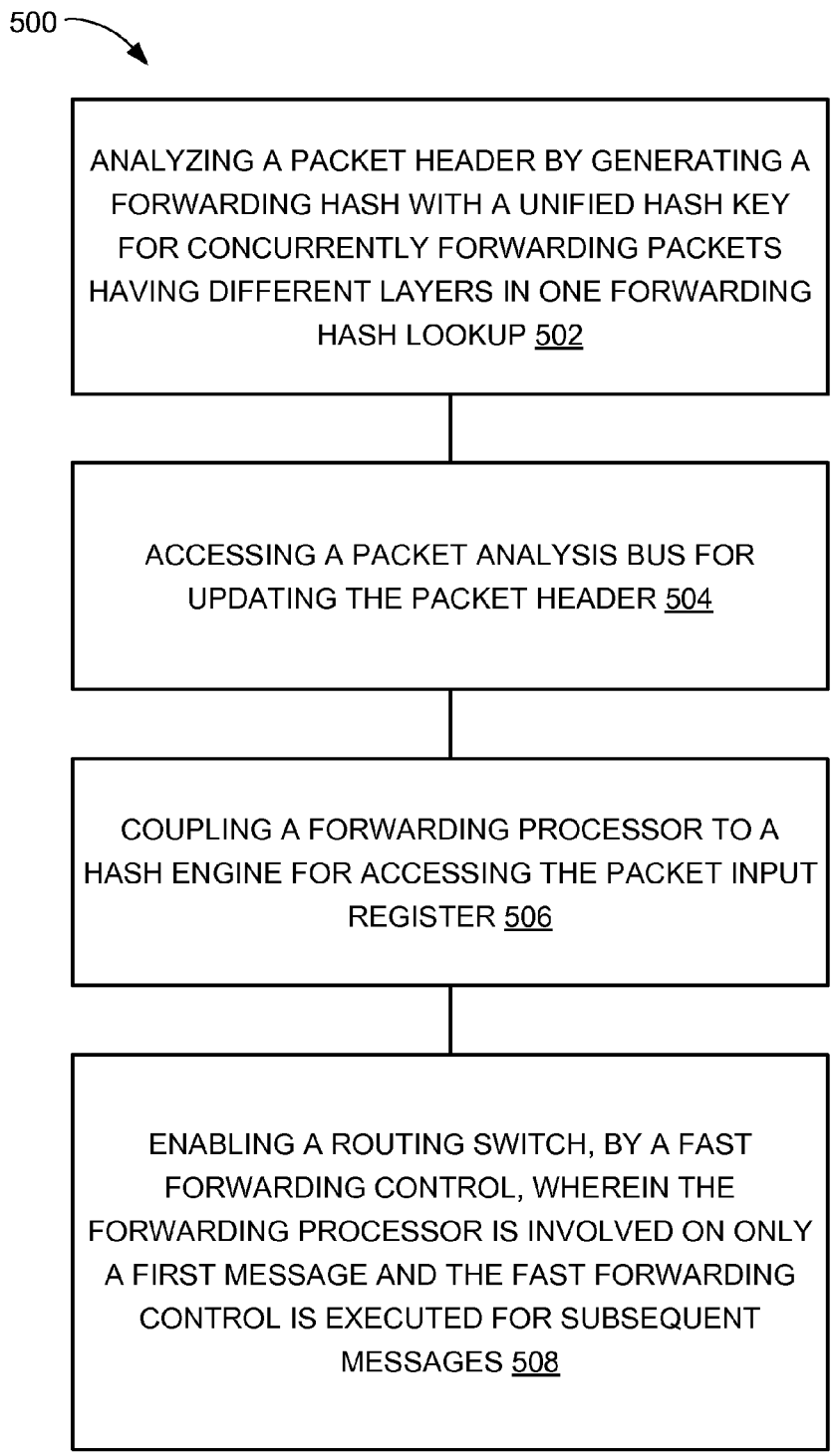
FIG. 5 is a flow chart of a method of operation of a navigation system in a further embodiment of the present invention.

Referring now to FIG. 5, therein is shown a flow chart of a method 500 of operation of a network communication system in a further embodiment of the present invention. The method 500 includes: analyzing a packet header by: loading a packet input register having a network layer control and a transport layer control, generating a forwarding hash with a unified hash key based on fields in the packet input register including the network layer control and the transport layer control, wherein any of the fields not used is filled with zeroes and the forwarding hash with the unified hash key is for concurrently forwarding packets having different layers in one forwarding hash lookup, and identifying a routing update by comparing the forwarding hash in a block 502; accessing a packet analysis bus for updating the packet header in a block 504; coupling a forwarding processor to a hash engine for accessing the packet input register through the hash engine in a block 506; and enabling a routing switch, by a fast forwarding control, for forwarding a packet including the packet header updated, wherein the forwarding processor is involved on only a first message of a series of messages to program the routing switch and the fast forwarding control is executed for subsequent messages of the series by the hash engine without intervention of the forwarding processor in a block 508.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a network communication system comprising:
    analyzing a packet header by:
        loading a packet input register having a network layer control and a transport layer control,
        generating a forwarding hash with a unified hash key based on fields in the packet input register including the network layer control and the transport layer control, wherein any of the fields not used is filled with zeroes and the forwarding hash with the unified hash key is for concurrently forwarding packets having different layers in one forwarding hash lookup, and
        identifying a routing update by comparing the forwarding hash;
    accessing a packet analysis bus for updating the packet header;
    coupling a forwarding processor to a hash engine for accessing the packet input register through the hash engine; and
    enabling a routing switch, by a fast forwarding control, for forwarding a packet including the packet header updated, wherein the forwarding processor is involved on only a first message of a series of messages to program the routing switch and the fast forwarding control is executed for subsequent messages of the series by the hash engine without intervention of the forwarding processor.

2. The method as claimed in claim 1 further comprising providing the forwarding processor for generating the routing update.

3. The method as claimed in claim 1 further comprising providing the hash engine for activating the fast forwarding control and enabling the routing switch.

4. The method as claimed in claim 1 further comprising:
    providing a transfer table memory for storing the routing update; and
    providing a switching table in the transfer table memory for determining the routing update.

5. The method as claimed in claim 1 wherein generating the forwarding hash from the packet input register includes enabling a switching layer control.

6. A method of operation of a network communication system comprising:
    analyzing a packet header by a hash engine including:
        loading a packet input register having a network layer control and a transport layer control,
        generating a forwarding hash with a unified hash key based on fields in the packet input register including the network layer control and the transport layer control, wherein any of the fields not used is filled with zeroes and the forwarding hash with the unified hash key is for concurrently forwarding packets having different layers in one forwarding hash lookup, and
        identifying a routing update by comparing the forwarding hash;
    accessing a packet analysis bus for updating the packet header;
    coupling a forwarding processor to the hash engine for accessing the packet input register through the hash engine; and
    enabling a routing switch, by a fast forwarding control, for forwarding a packet including the packet header updated, wherein the forwarding processor is involved on only a first message of a series of messages to program the routing switch and the fast forwarding control is executed for subsequent messages of the series by the hash engine without intervention of the forwarding processor.

7. The method as claimed in claim 6 further comprising providing the forwarding processor for generating the routing update including writing a next hop entry for the forwarding hash.

8. The method as claimed in claim 6 further comprising activating the fast forwarding control for enabling the routing switch when the forwarding hash is found or activating an initial forwarding control, by the forwarding processor, when the forwarding hash is not found.

9. The method as claimed in claim 6 further comprising:
    providing a transfer table memory for storing the routing update; and
    providing a switching table in the transfer table memory for determining the routing update.

10. The method as claimed in claim 6 further comprising loading a hash table having a hash entry based on the packet input register.

11. A network communication system comprising:
a hash engine for analyzing a packet header by:
  a packet input register having a network layer control and a transport layer control,
  a circuit for generating a forwarding hash with a unified hash key based on fields in the packet input register including the network layer control and the transport layer control, wherein any of the fields not used is filled with zeroes and the forwarding hash with the unified hash key is for concurrently forwarding packets having different layers in one forwarding hash lookup, and
  a comparator for identifying a routing update includes the forwarding hash compared;
a packet analysis bus between the hash engine and the packet input register;
a forwarding processor, coupled to the hash engine, for accessing the packet input register through the hash engine; and
a routing switch coupled to the packet input register and the hash engine, the routing switch enabled, by a fast forwarding control, for forwarding a packet including the packet header updated, wherein the forwarding processor is involved on only a first message of a series of messages to program the routing switch and the fast forwarding control is executed for subsequent messages of the series by the hash engine without intervention of the forwarding processor.

12. The system as claimed in claim 11 wherein the forwarding processor is coupled to the hash engine for generating the routing update.

13. The system as claimed in claim 11 further comprising the fast forwarding control, coupled to the routing switch, activated by a match to the forwarding hash identified by the comparator.

14. The system as claimed in claim 11 further comprising a packet output buffer coupled to the routing switch.

15. The system as claimed in claim 11 further comprising a routing layer control in the hash engine.

16. The system as claimed in claim 11 further comprising:
a hash entry in the hash engine; and
a next hop entry linked to the hash entry.

17. The system as claimed in claim 16 wherein the forwarding processor is coupled to the hash engine for generating the routing update includes a transfer table memory accessed by the forwarding processor.

18. The system as claimed in claim 16 further comprising the fast forwarding control, coupled to the routing switch, activated by a match to the forwarding hash identified by the comparator.

19. The system as claimed in claim 16 further comprising a packet output buffer coupled to the routing switch.

20. The system as claimed in claim 16 wherein the circuit is for loading a hash table having a hash entry based on the packet input register.

* * * * *